United States Patent [19]

Moss

[11] Patent Number: 4,807,951
[45] Date of Patent: Feb. 28, 1989

[54] HOLOGRAPHIC THIN PANEL DISPLAY SYSTEM

[75] Inventor: Gaylord E. Moss, Marina del Rey, Calif.

[73] Assignee: Hughes Aircraft Company, Los Angeles, Calif.

[21] Appl. No.: 789

[22] Filed: Jan. 6, 1987

[51] Int. Cl.$^4$ ............................................... G03H 1/22
[52] U.S. Cl. ....................................... 350/3.85; 350/3.6
[58] Field of Search ....................... 350/3.77, 3.6, 3.84, 350/3.83, 174, 3.7, 3.85

[56] References Cited

U.S. PATENT DOCUMENTS

| | | | |
|---|---|---|---|
| 3,506,327 | 4/1970 | Leith et al. | 350/3.77 |
| 3,560,921 | 2/1971 | Lopez | 350/3.85 |
| 3,561,838 | 2/1971 | Gabor | 350/3.85 |
| 3,848,974 | 11/1974 | Hosking et al. | 350/174 |
| 3,947,085 | 3/1976 | Mottier | 350/3.85 |
| 4,643,515 | 2/1987 | Mopatnieks | 350/3.83 |

FOREIGN PATENT DOCUMENTS 60191847 of 0000 Japan .

OTHER PUBLICATIONS

Holography with Guided Optical Waves, Applied Physics 21, 55-63 (1980).

Primary Examiner—Bruce Y. Arnold
Attorney, Agent, or Firm—Leonard A. Alkov; A. W. Karambelas

[57] ABSTRACT

An improved, relatively thin panel display includes a housing member supporting a hologram containing a holographic image of predetermined indicia that can be appropriately illuminated to appear to the observer as being positioned at a location offset from the actual location of the hologram panel display member. The hologram member can be illuminated by either back lighting, front lighting, or side lighting with the use of either transmission or reflective holographic images. One embodiment of the invention can be combined with a steering wheel with the virtual image of the indicia being located at a sufficient depth to enable the eyes of the viewer to focus comfortably on the panel indicia information.

20 Claims, 3 Drawing Sheets

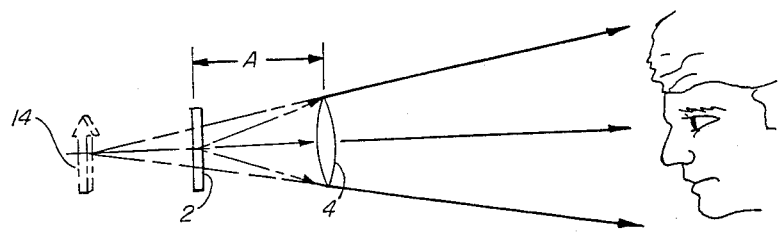
FIG. 1
(PRIOR ART)
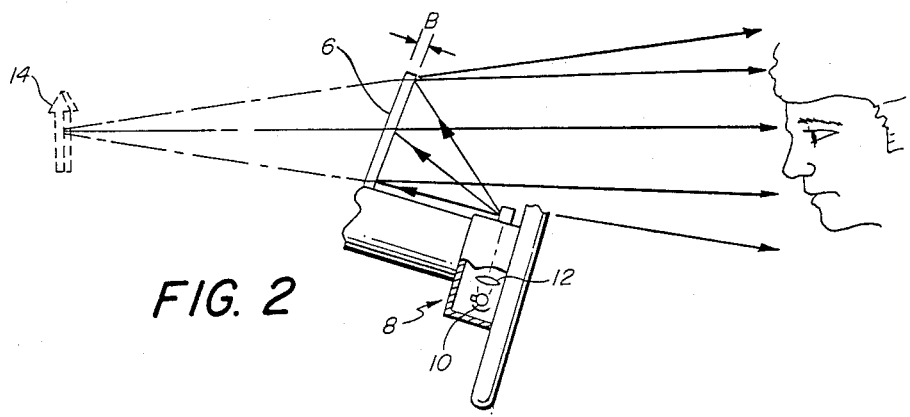
FIG. 2
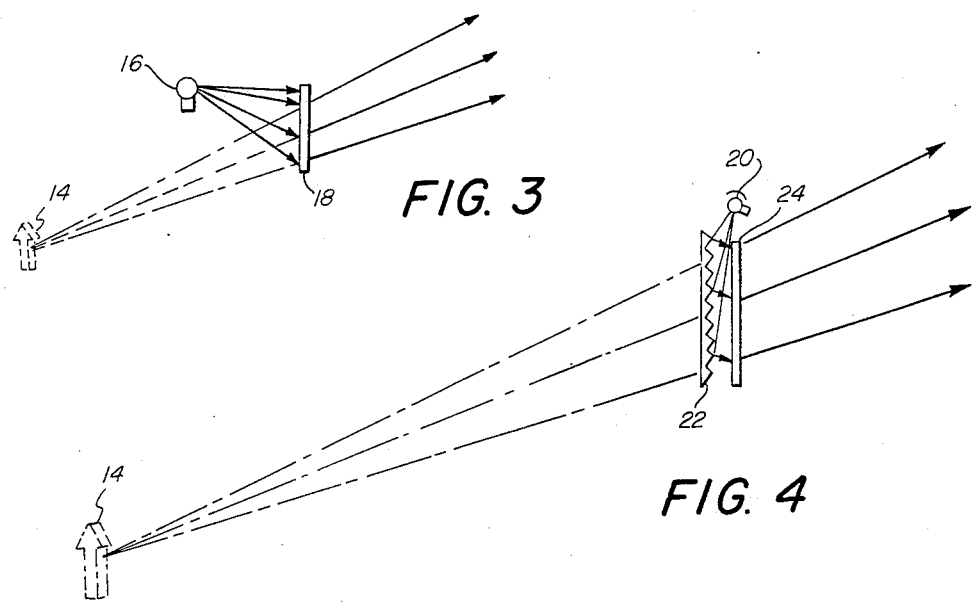
FIG. 3
FIG. 4

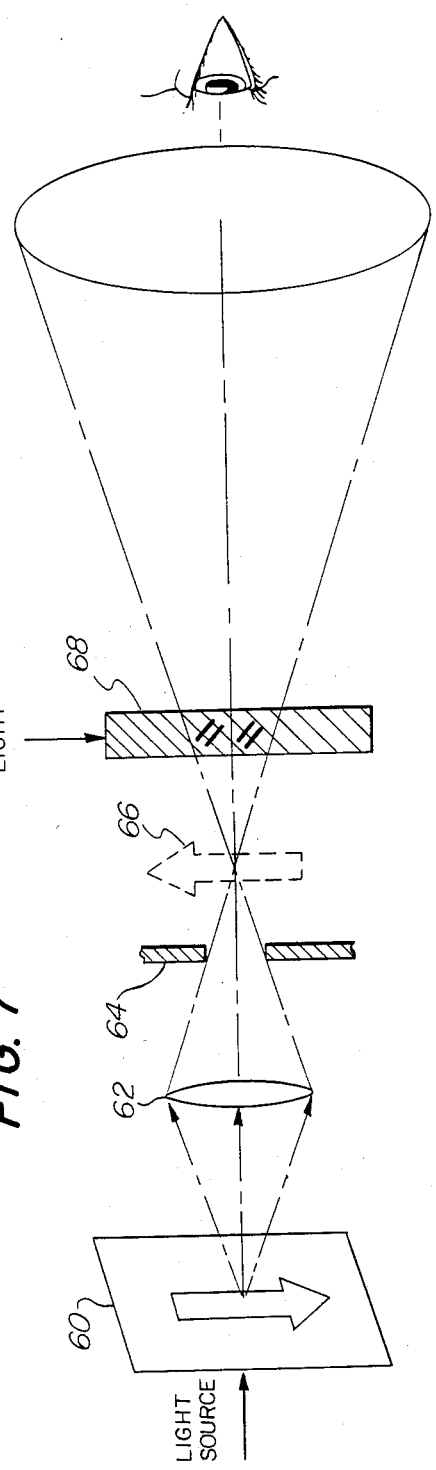
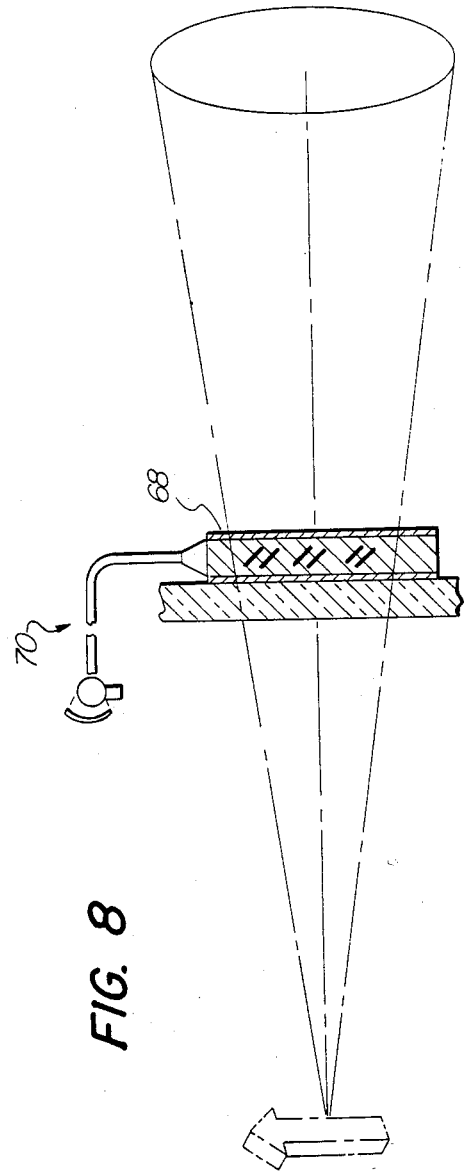

HOLOGRAPHIC THIN PANEL DISPLAY SYSTEM

BACKGROUND OF THE INVENTION

1. Field of the Invention

The present invention relates to a thin panel display, for example for a vehicle, and more particularly to a holographic thin panel display that provides an apparent depth to the indicia realized, when appropriately illuminated, to accomodate the vision of the viewer.

2. Description of Related Art

Various form of panel displays are known for providing indicia representative of the operating condition of a particular system or process. A common form of display is that utilized in aircraft and vehicles to provide an indication of the various operating characteristics that are necessary for the operator to observe, such as disclosed in U.S. Pat. Nos. 3,940,204 and 4,447,128. Frequently, the location of the panel and the distance to the operator requires an adjustment to take into consideration the focusing ability of the operator. This unique problem can occur when the operator is basically farsighted and has difficulty in focusing on a relatively near display. As the human eye ages, it loses its flexibility to focus on nearby objects and thereby defeats the capacity of prior displays that were to be mounted, for example, on the steering wheel hub of a car.

Federal regulations to increase the fuel efficiency of cars have resulted in more compact cars with limited interior space. The various fuel emission controls have further reduced the space available in the engine. This is further complicated by the recent aerodynamic body configurations provided on autos to reduce drag. As a result, the provision for space in an automobile of a compact design is a critical design factor.

The prior art is still striving to provide improved panel displays and in the automotive field, they are attempting to provide thin improved panel displays that will accomodate the focusing ability of a driver.

SUMMARY OF TH INVENTION

An improved, relatively thin holographic panel display is provided that includes a supporting housing member that mounts a hologram member within the line of sight of an operator. The hologram member contains a holographic image of a virtual image of a wave front of predetermined indicia that, when appropriately illuminated for reconstruction of the wave front, will appear to the observer as being positioned at a location offset from the actual location of the hologram member. Various arrangements are provided for illuminating the holographic image at the appropriate angle and bandwidth to realize the virtual image. Preferably, the means for illuminating can be of a monochromatic source to minimize any chromatic aberrations. The panel display of the present invention can virtually approach the thickness of a hologram member while providing a virtual image that appears offset to give an illusion of depth to the driver. Since the hologram member has the capability of providing a recording of the wave front, the image observed by the viewer can be spatially located to permit an accomodation of the focusing power of the operator.

The hologram member can be of a transmission type wherein the illuminating light back-lights the hologram member for observation by the viewer. The hologram member can also be of the reflective type wherein the illumination will be on the same side of the panel display as the viewer. Advantageously, the hologram can be constructed to accomodate an edge lit playback reference beam. Additionally, the present invention can be utilized in combination with a steering wheel having a central hub that is capable of providing prime unobstructed viewing area within the line of sight of a driver of a vehicle.

The foregoing and other objects, advantages, and features of the present invention will become apparent from the following description taken in conjunction with the accompanying drawings which illustrate the specific embodiments of the present invention.

BRIEF DESCRIPTION OF THE DRAWINGS

In the accompanying drawings:

FIG. 1 shows a schematic of a conventional panel display;

FIG. 2 discloses a schematic of a reflective hologram display;

FIG. 3 discloses a schematic of a transmission hologram panel display;

FIG. 4 discloses a side illuminated hologram panel display in combination with a Fresnel mirror, FIG. 7 represents a preferred construction technique of creating a hologram, and FIG. 8 discloses an edge lit hologram providing a virtual image of a desired indicia.

In the following description, like parts are designated by like reference numbers through the several drawings.

DETAILED DESCRIPTION OF THE PREFERRED EMBODIMENTS

Figure 5:
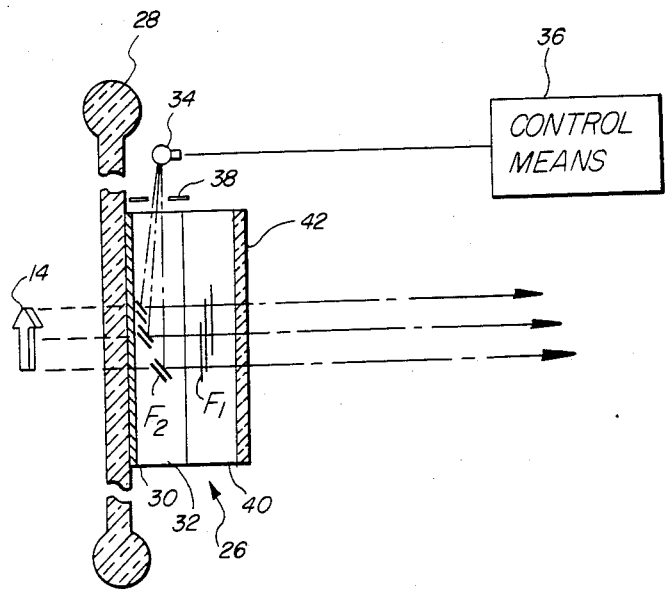
FIG. 5 shows a schematic cross sectional view with an exaggerated view of a hologram member mounted on the hub of a steering wheel.

The following description is provided to enable any person skilled in the optical and automotive fields to make and use the invention and sets forth the best modes contemplated by the inventor of carrying out his invention. Various modifications, however, will remain readily apparent to those skilled in the art since the generic principles of the present invention have been defined herein specifically to provide a relatively economical and easily manufactured thin panel hologram display for use per se as a panel display or in combination with another component, such as a steering wheel for a vehicle.

Referring to FIG. 1, a conventional panel 2 display is disclosed having a depth A, comprising essentially the display indicia that usually requires an additional space for presentation of the information and conventional optics 4 or mirrors to present a distant image. The conventional display panel as shown in FIG. 1 cannot generally be utilized where space is at a minimum, since typically a depth of one and a half to two times the width of the display is required for the optical configuration. Additionally, these displays can be relatively expensive and are generally beyond the availability of a mass produced item, such as for use on an automobile, in terms of cost.

FIG. 2 discloses a hologram panel display member 6 having a depth B that can be illuminated by front lighting from an illumination source 8 that can include a light 10 and a projection lens 12. The hologram member 6 is of a reflective type. A hologram member 6 can be manufactured in quantities as a thin flat plastic film replicated from a master hologram at a relatively low cost. As can be seen, the hologram member is a flat panel of approximately 30 microns in thickness that does not require any depth for illumination if the lighting source 8 can be placed in front of the hologram. Thus, a display can be provided to the operator wherein the virtual image or the indicia which is represented as an arrow 14 appears at a location behind and offset from the actual location of the hologram member 6. The hologram member 6 contains approximately a 30 micron film layer, such as dichromated gelatin or polyvinyl carbazole, having a developed holographic image of a virtual image wave front of the predetermined indicia. The film layer can be developed on a flexible transparent substrate, such as mylar. Then appropriately illuminated by the light source 8, it is realized for viewing by the viewer.

The specific holographic materials are known in the prior art and can be found in reference material, such as "Topics in Applied Physics", Vol. 20, Holographic Recording Materials by H. M. Smith, Springer Verlage, Berlin, Germany, 1977. Additionally, background on holographic procedures can be found in "Optical Holography" by Collier et al, Academic Press, New York, N.Y. (1971).

Referring to FIG. 3, an alternative embodiment of the present invention is disclosed wherein the indicia 14 can be realized by a light source 16 mounted behind a transmission hologram 18. Preferably, the surrounding surfaces behind the transmission hologram (not shown) are coated black to prevent any reflection of light from exterior lighting to inadvertently realize the image. It is also preferable that the image be formed with a monochromatic light to help minimize any possible chromatic aberrations. As can be readily appreciated, the observer will perceive the arrow 14 as a virtual image at a sufficient distance to accomodate the focusing ability of the viewer.

Another embodiment of the present invention is disclosed in FIG. 4 wherein a side light source 20 can be appropriately juxtapositioned adjacent a Fresnel mirror 22 to illuminate a transmission hologram 24 carrying the appropriate holographic image of the predetermined indicia. As can be seen, some additional depth is required to accomodate this configuration but it is still considerably shorter than the conventional panel display.

As can be appreciated, a series or combinations of hologram members and series and combinations of reconstruction light beams can be utilized to indicate the different status of operating conditions or different values of a single operating condition through appropriate illumination. Thus, the present invention in providing a thin hologram panel display is not limited by the subjective configuration of the indicia and the information that can be presented to the viewer. For example, in the automotive field, numerous operating characteristics of the engine and of driver controls can be provided on the thin panel display of the present invention.

An alternative embodiment of the present invention is disclosed in FIG. 5 wherein a unique double film reflective hologram member 26 is disclosed mounted to a steering column or hub of the steering wheel. This hologram member is equally applicable for mounting simply as a panel display on the dashboard and is only illustratively shown in FIG. 5 in an exaggerated view for mounting on a steering column of a steering wheel 28. In this embodiment, a substrate 30 can be appropriately adhered to or laminated to the flat hub portion of the steering wheel 28 and supports a first holographic film layer 32 that has developed in it a reflective optic configuration equivalent to the fresnel mirror 22 of FIG. 4. The reflective fringes F2 are disclosed as a series of gratings designed to accomodate a particular location of a light source 34 that can be appropriately controlled through a control means 36. An aperture member 38 can be utilized to insure that the light is directed at the appropriate angular arrangement required to provide an illumination of a transmissive film layer 40 for carrying the predetermined indicia represented by the grating lines F1. Finally, a transparent abrasive and waterproofing layer 42, such as available polymer films or glass like deposition film coatings, e.g. silicon nitrides, silicon dioxide, etc., can seal and protect the hologram member 26. Thus, the indicia represented simply by the arrow 14 can appear as a virtual image at a sufficient depth and distance to the driver that his eyes can accomodate and focus on the information.

Figure 6:
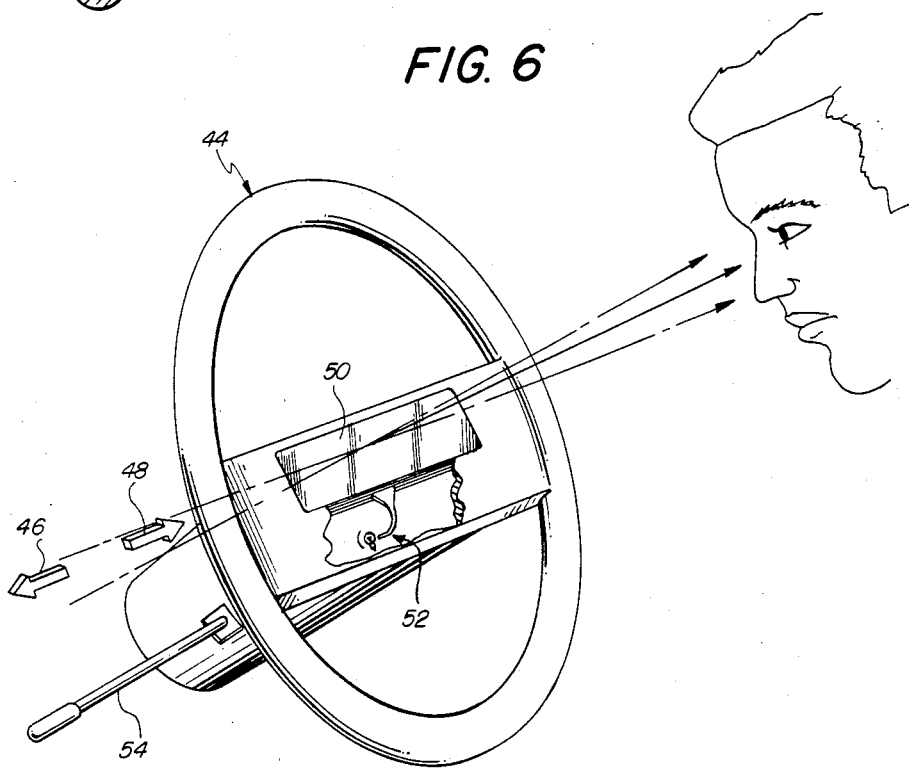
FIG. 6 shows a perspective view of a steering hub mounting the thin panel display of the present invention.

FIG. 6 discloses simply an illustrative embodiment of a combination steering wheel and thin panel hologram display unit 44 capable of disclosing virtual images of turn signal arrows 46 and 48. The steering wheel itself can be of the conventional circular or oval configuration and the hub portion of the steering wheel column will accomodate a dual film layer reflection hologram member 50 of the type shown in cross section in FIG. 5. A lighting source 52 can be appropriately mounted to only contact the edge of the reflective film layer to illuminate the appropriate indicator arrow when the turn lever 54 is activated. As can be expected, one light in the light source 52 can illuminate the holographic virtual image of the left turn signal 46 and another light (not shown) can be utilized to illuminate the holographic virtual image of the right turn signal 48. Selectivity can be accomplished by changing the angle of the constructive reference beam during production of the hologram, or by selective wavelengths, or even by utilizing multiple layers of holograms with each layer carrying different indicia.

While the turn indicator indicia is disclosed in FIG. 6, it should be recognized that the steering column can be utilized for subjective presentation of other indicia, such as low fuel, engine overheat, status of oil pressure, etc. and the combination steering wheel hologram panel display should not be limited to the embodiments shown in FIG. 6. In the environment of the automobile and vehicle field, the thin panel display of the present invention can be used in the steering wheel hub, as shown in FIG. 6, and on the dashboard instrument panel, as shown in FIGS. 2, 3, and 4, it also could be used on an overhead console, since minimal space is necessary for the present invention. Additionally, a retrofit assembly can be utilized to convert older automobiles to achieve the advantages of the present invention with an appropriate connection and conversion of the sensor information that monitors the various operating characteristics of an automobile to accomodate the display panel of the present invention.

FIG. 7 discloses the construction of a single layer hologram in a schematic diagram for illustration purposes. The predetermined indicia member 60 can be lit to provide a source object, such as an arrow. A lens member 62 can focus the object to create a real image in space 66. An aperture member 64 can define the viewing aperture that is desired, for example, it may be desirable to limit the display to only the driver, in accordance with the SAE standard eyellipse for 99% of the drivers. The holographic layer 68 can be illuminated with a reference beam to develop the image as diffraction gratings within the holographic layer. In this embodiment the reference beam is directed within the plane of the holographic layer to interface with the source image. By using edge lighting to introduce a reference beam numerous advantages can be realized. For example, the hologram can be mounted as a display and lit by one edge that will not be inadvertently blocked by exterior objects.

As can be seen in FIG. 8, the virtual image of the object can be realized when a reconstruction reference beam of the same wavelength is introduced by edge lighting of the hologram layer 68. The actual virtual image can be offset from the plane of the hologram or even tilted to extend through the hologram member at an angle. Thus, the hologram member provides a design option of locating the virtual image at the focusing depth of the observer regardless of the location of the display or even the inclination of the display. In determining the bandwidth of the reference light beam, there is tradeoff with the desired degree of resolution of the virtual image. That is, the larger the bandwith, the less resolution.

Various modifications to the above described invention may be readily apparent to those skilled in the optical and automotive fields in view of the above described generic concepts. Therefore, the scope of the present invention should be interpreted solely from the following claims.

What is claimed is:

1. An improved minimal depth panel display for an instrument panel to be observed by the operator of a vehicle, comprising:
    a hologram member of a thin dimension containing a holographic image of a predetermined panel display indicia that, when appropriately illuminated, will provide an image of the indicia at a location offset from the actual location of the hologram member whereby the operator will perceive the image as being produced by a panel having a greater offset depth than the thickness of the hologram member, wherein the hologram member includes a first film layer for supporting the holographic image of the panel display indicia and a second film layer for providing a reflective surface for redirecting light from an off axis position through the first film image to realize the image;
    means for supporting the hologram member in the vehicle, and
    means for illuminating the holographic image to realize the image.

2. The invention of claim 1 wherein the hologram member is a transmission hologram and the means for illuminating the holographic image is on the side of the transmission hologram member farthest from the operator.

3. The invention of claim 1 wherein the hologram member is a reflective hologram and the means for illuminating the holographic image is on the same side of the reflective hologram member as the operator.

4. The invention of claim 1 wherein the means for illuminating is positioned on an edge of the hologram member.

5. An improved steering wheel and display apparatus for a driver of a vehicle comprising:
    a steering wheel adapted to be connected to a steering column to control the direction of a vehicle;
    a hologram member containing a holographic image of a predetermined panel display indicia that, when appropriately illuminated, will provide a virtual image of the indicia which appears to said driver to be positioned at a location offset from the actual location of the hologram member to give an illusion of depth to said driver so that the eyes of the driver are accommodated for the focusing ability of said driver;
    means for positioning the hologram member on the steering wheel; and
    means for illuminating the holographic image to realize the virtual image.

6. The invention of claim 5 wherein the predetermined indicia are turn signal indicators.

7. The invention of claim 5 wherein the means for illuminating the holographic image is a reference light beam that is coupled to an edge of the holographic member.

8. An improved relatively thin panel display comprising:
    a display housing member;
    a hologram member mounted on the housing member and containing a holographic image of a virtual image wave front of predetermined indicia that, when appropriately illuminated, will appear to the observer as being positioned at a location offset from a plane containing at least a portion of the hologram member;
    a Fresnel mirror positioned adjacent the hologram member, and
    means for illuminating the holographic image to realize the virtual image including an illumination source juxtapositioned between and on one side of the Fresnel mirror and the hologram member.

9. An improved relatively thin panel display comprising:
    a display housing member;
    a hologram member mounted on the housing member and containing a holographic image of a virtual image wave front of predetermined indicia that, when appropriately illuminated, will appear to the observer as being positioned at a location offset from a plane containing at least a portion of the hologram member, wherein the hologram member includes a first film layer for supporting the holographic image of the panel display indicia and a second film layer for providing a surface for redirecting light from an off axis position through the first film image to realize the image, and
    means for illuminating the holographic image to realize the virtual image.

10. The invention of claim 9 wherein the hologram member is a transmission hologram and the means for illuminating the holographic image is on the side of the transmission hologram member furthest from the operator.

11. The invention of claim 9 wherein the hologram member is a reflective hologram and the means for illuminating the holographic image is on the same side of the reflective hologram member as the operator.

12. The invention of claim 9 wherein the means for illuminating is positioned on an edge of the hologram member and the second film layer directs the light substantially normal to the plane of the hologram member through the first film layer.

13. The invention of claim 9 wherein the second film layer surface is reflective.

14. The invention of claim 9 wherein the second film layer is transmissive.

15. An improved minimal depth panel display comprising:
   a thin housing member;
   a hologram member of a thickness which is smaller than the total thickness of the housing member, mounted on the housing member and containing a holographic image of a display indicia that, when appropriately illuminated, will appear to the observer as being positioned at a location offset from the actual location of the hologram member, wherein the hologram member includes a first film layer for supporting the holographic image of the panel display indicia and a second film layer for providing a reflective surface for redirecting light from an off axis position through the first film image to realize the image.

16. The invention of claim 15 wherein the hologram member is a transmission hologram and the means for illuminating the holographic image is on the side of the transmission hologram member farthest from the operator.

17. The invention of claim 15 wherein the hologram member is a reflective hologram and the means for illuminating the holographic image is on the same side of the reflective hologram member as the operator.

18. The invention of claim 15 wherein the means for illuminating is positioned on an edge of the hologram member.

19. An improved minimal depth panel display comprising:
   a thin housing member;
   a hologram member, of a thickness which is smaller than the total thickness of the housing member, mounted on the housing member and containing a holographic image of a display indicia that, when appropriately illuminated, will appear to the observer as being positioned at a location offset from the actual location of the hologram member;
   a Fresnel mirror positioned adjacent the hologram member, and
   means for illuminating the holographic image to realize the virtual image at the option of the operator including an illumination source juxtapositioned between and on one side of the Fresnel mirror and the hologram member.

20. An improved minimal depth panel display for an instrument panel to be observed by the operator of a vehicle, comprising:
   a hologram member of a thin dimension containing a holographic image of a predetermined panel display indicia that, when appropriately illuminated, will provide a virtual image of the indicia at a location offset form the actual location of the hologram member whereby the operator will perceive the image as being produced by a panel having a greater offset depth than the thickness of the hologram member;
   a Fresnel mirror positioned adjacent the hologram member;
   means for supporting the hologram member in the vehicle, and
   means for illuminating the holographic image to realize the virtual image including an illumination source juxtapositioned between and on one side of the Fresnel mirror and the hologram member.

* * * * *